(12) United States Patent
Fukuhara

(10) Patent No.: US 8,482,811 B2
(45) Date of Patent: Jul. 9, 2013

(54) RECORDING APPARATUS

(75) Inventor: Yoshihisa Fukuhara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1413 days.

(21) Appl. No.: 10/988,762

(22) Filed: Nov. 15, 2004

(65) Prior Publication Data

US 2005/0111821 A1 May 26, 2005

(30) Foreign Application Priority Data

Nov. 21, 2003 (JP) ................................. 2003-391695

(51) Int. Cl.
*H04N 5/76* (2006.01)
*H04N 1/40* (2006.01)

(52) U.S. Cl.
USPC ........... 358/448; 358/453; 358/462; 386/125; 386/46; 386/117; 386/52; 386/95

(58) Field of Classification Search
USPC .......................................... 386/125, 46, 117
See application file for complete search history.

(56) References Cited

U.S. PATENT DOCUMENTS 7,099,557 B1 * 8/2006 Morotomi et al. ............ 386/287
2002/0197058 A1 * 12/2002 Suzuki et al. .................... 386/69

* cited by examiner

*Primary Examiner* — Steven Kau
*Assistant Examiner* — Quang N Vo
(74) *Attorney, Agent, or Firm* — Cowan, Liebowitz & Latman, P.C.

(57) ABSTRACT

A recording apparatus according to the present invention includes: a recording portion for recording image data on a random-access recording medium; a reproducing portion for reproducing image data recorded on the recording medium and recording stop position information indicating a recording stop position of the image data on the recording medium; and a control portion for controlling the reproducing portion to reproduce the image data from a position a predetermined time before the recording stop position in response to a preview instruction and stop the reproduction at the recording stop position.

17 Claims, 6 Drawing Sheets

RECORDING APPARATUS

BACKGROUND OF THE INVENTION

1. Field of the Invention

The present invention relates to an apparatus for recording image data on a random-access recording medium.

2. Related Background Art

Up to now, a recording and reproducing apparatus integrated with a camera using a tape as a recording medium continuously records image data on the tape in time series, so that it is possible to find a last recording position, a last reproduction position, and the like according to a stop position of the tape.

In recent years, a video camera, which uses a disk medium as a recording medium instead of a tape, has been on the market. The video camera using a disk uses a table of contents (hereinafter referred to as TOC) as management information for controlling a recording operation and a reproducing operation of image data. When picked-up image data is recorded on the disk, TOC information is stored in an area (system information management area) ensured on an inner side of a disk independently from an area for recording the image data.

At the time of reproduction, the video camera reads out the TOC information from the disk and performs control for various operations. This TOC information is information such as start position information, end position information, and link position information of recorded image data. The TOC information is set for each image section called a scene, a unit of which corresponds to a time period from start of recording until stop of the recording, and an index screen for each of the scenes is displayed.

At the time of a recording mode, when preview is instructed at the time of temporary stop of recording, the video camera reproduces the image data from a top position of a last-recorded scene, which is in the TOC information. On the other hand, a last reproduction scene is stored as long as the disk is not removed. The last reproduction scene is emphasized and displayed as shown in FIG. 6 such that a user can see where the last reproduction scene is. In reproduction, the video camera reproduces the image data from a top position of the scene according to the TOC information.

In addition, in this type of video camera using a disk medium, it is conceivable that information of a last reproduction position on a disk is recorded and next reproduction is started subsequently from a reproduction stop position of the last time as disclosed in Japanese Patent Application Laid-Open No. H10-97766 and Japanese Patent Application Laid-Open No. 2000-57751.

However, in Japanese Patent Application Laid-Open No. H10-97766 and Japanese Patent Application Laid-Open No. 2000-57751, only information of a reproduction stop position is recorded. Thus, when a user desires to watch a recording end part of the last recording at the time of start of recording, the user cannot help but reproduce image data from a top of a scene recorded last. In order to reproduce the image data for a few seconds from the recording end part, it is necessary to perform searching processing of the top position. Therefore, it is complicated for the user to watch a recording end part of a long scene.

SUMMARY OF THE INVENTION

It is an object of the present invention to solve the problem described above.

It is another object of the present invention to provide an apparatus friendly to even a user accustomed to a tape.

In order to attain the above-mentioned objects, according to one aspect of the invention, a recording apparatus comprises: recording means for recording image data on a random-access recording medium; reproducing means for reproducing image data recorded on the recording medium and recording stop position information indicating a recording stop position of the image data on the recording medium; and control means for controlling the reproducing means to reproduce the image data from a position a predetermined time before the recording stop position in response to a preview instruction and stop the reproduction at the recording stop position.

Other objects and features of the present invention will be apparent from the following detailed explanation of modes of the present invention with reference to the accompanying drawings.

DESCRIPTION OF THE PREFERRED EMBODIMENTS

Embodiments of the present invention will be hereinafter explained in detail with reference to the accompanying drawings.

First Embodiment

Figure 1:
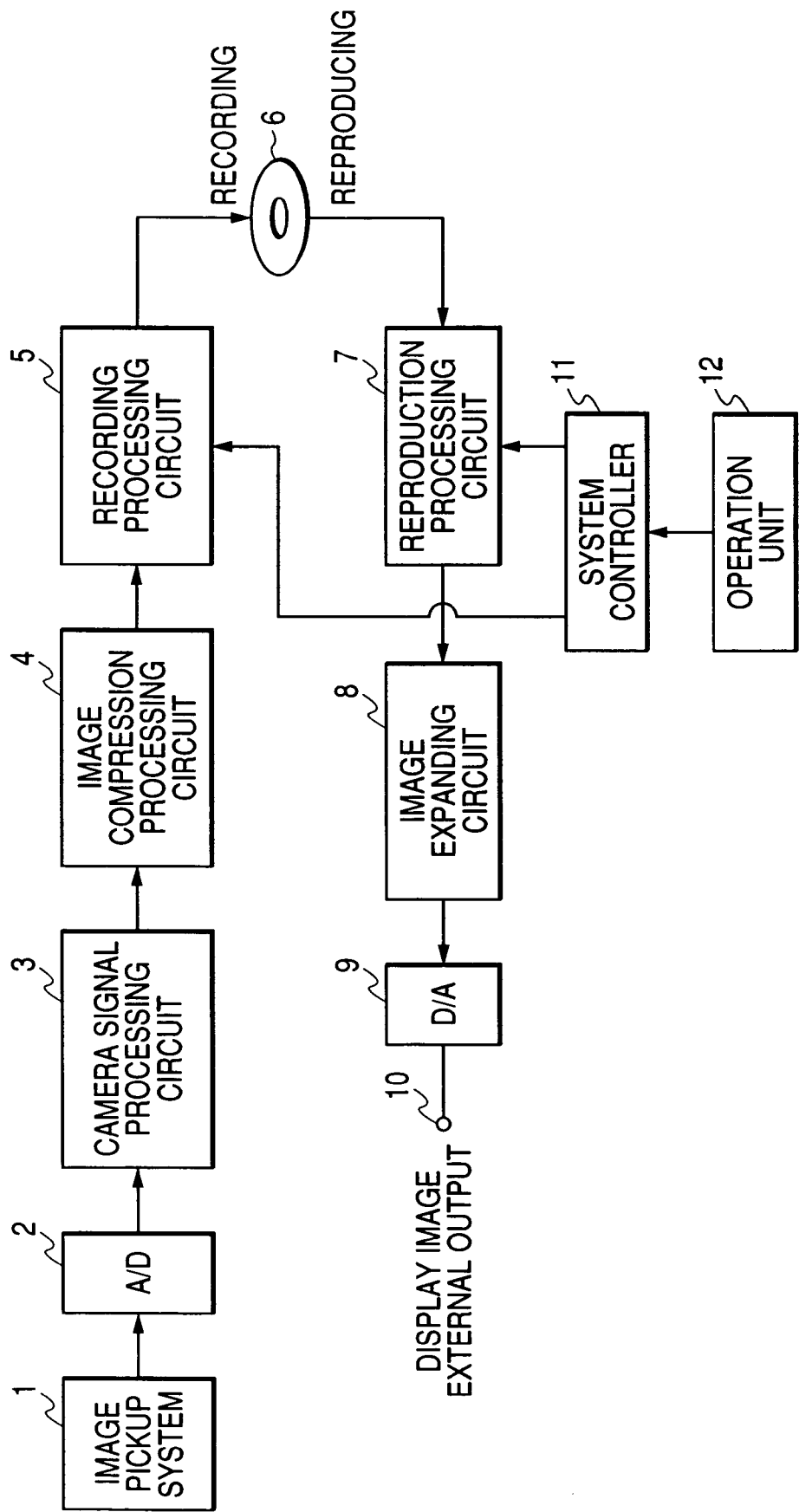
FIG. 1 is a diagram showing a structure of a video camera to which the present invention is applied.

FIG. 1 is a diagram showing a structure of a video camera to which the present invention is applied. In the figure, reference numeral 1 denotes an image pickup system including a lens and a CCD; 2, an A/D converter; 3, a camera signal processing circuit; 4, an image compression processing circuit that encodes image data and compresses an amount of information of the image data; 5, a recording processing circuit that applies processing necessary for recording to the image data subjected to encoding and records the image data on a disk 6; 6, the disk serving as a recording medium; 7, a reproduction processing circuit that reproduces the image data recorded on the disk 6; 8, an image expanding circuit that decodes the image data with a decoding system corresponding to an encoding system in the image compression processing circuit 4 and expands an amount of information of the image data; 9, a D/A converter; 10, an image output terminal connected to an external monitor and the like; 11, a system controller that controls operations of the entire apparatus; and 12, an operation unit for inputting an operation instruction.

In the structure shown in FIG. 1, an image signal obtained by photographing an object with the image pickup system 1 is digitized by the A/D converter 2 and supplied to the camera signal processing circuit 3. The camera signal processing circuit 3 performs, for example, adjustment processing for luminance and colors of image data supplied from the A/D converter 2. The image data processed by the camera signal processing circuit 3 is supplied to the image compression processing circuit 4. The image compression processing circuit 4 encodes the image data supplied from the camera signal processing circuit 3 on the basis of an algorithm of a predetermined compression system. As the compression system in this context, there is an MPEG system that compresses image data on a predetermined frame unit basis in order to reduce an amount of data. The image data compressed by the image compression processing circuit 4 is supplied to the recording processing circuit 5.

The recording processing circuit 5 converts the image data supplied from the image compression processing circuit 4 into a format suitable for recording, then records the image data on an image data recording area of the disk 6 using a recording head, and records TOC information on a system information management area provided inwardly from the image data recording area.

In reproducing the image data recorded on the disk 6, the reproduction processing circuit 7 reproduces the image data and the TOC from the disk 6 using a reproduction head (not shown) and performs conversion processing for converting image data back to data before format conversion in the recording processing circuit 5, on the image data read by the reproduction head. The image data thus processed is supplied to the image expanding circuit 8. The image expanding circuit 8 expands the image data supplied from the reproduction processing circuit 7 with a system corresponding to the compression system in the image compression processing circuit 4. The expanded image data is converted into an analog signal by the D/A converter 9 and supplied to the external monitor and the like via the image output terminal 10.

At the time of reproduction stop, a block (predetermined number of frames), which is a unit of image compression, is recorded on the system information management area of the disk 6 as last reproduction position information.

First, processing in a reproduction mode will be explained.

Figure 2:
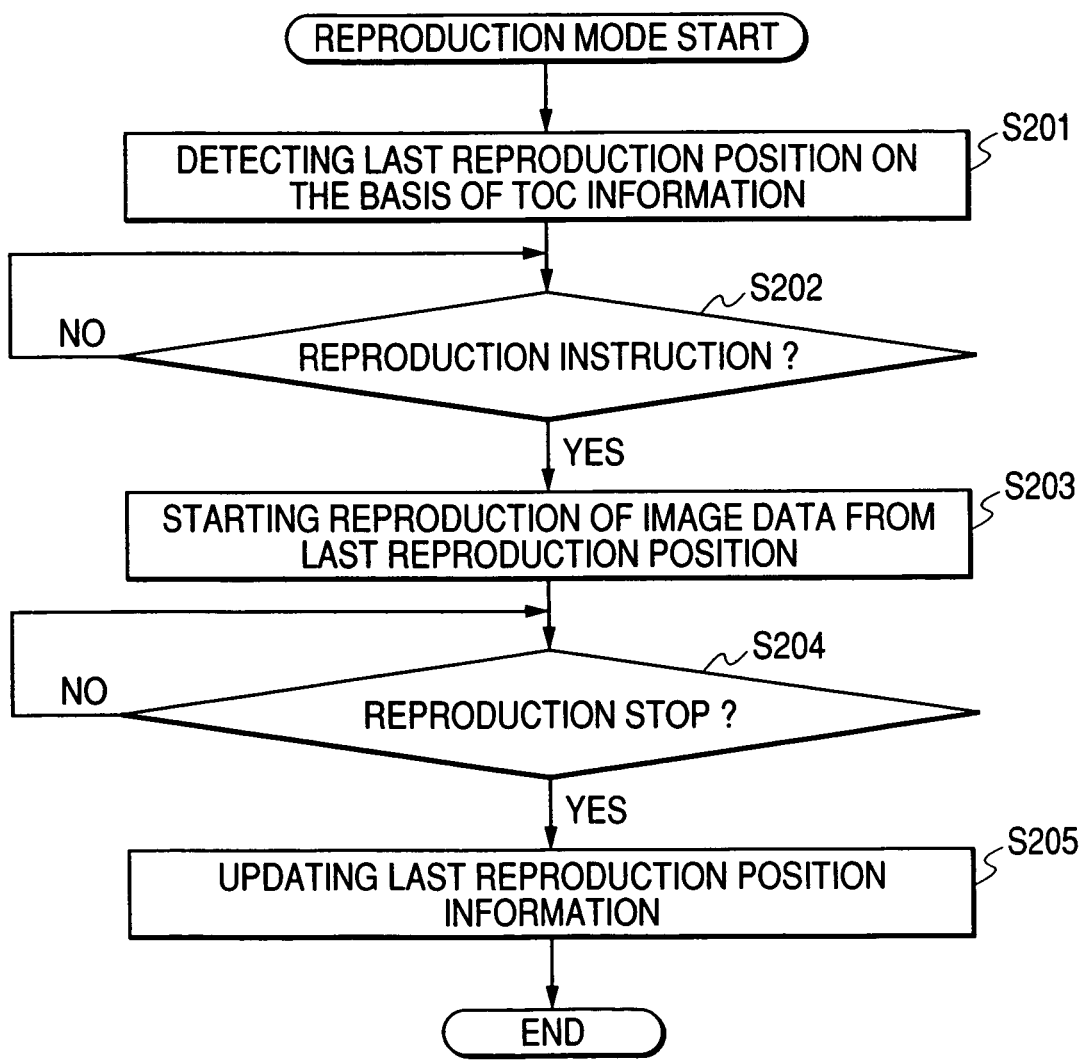
FIG. 2 is a flowchart showing processing at the time of reproduction.

FIG. 2 is a diagram showing processing by the system controller 11 in the reproduction mode.

When the video camera is brought into the reproduction mode from a stopping state in response to an operation of the operation unit 12, the system controller 11 reads out TOC information recorded on the system information management area of the disk 6 and detects a last reproduction position on the basis of the last reproduction position information included in the TOC information (S201). Next, when a reproduction instruction is received from a user (S202), the system controller 11 starts reproduction of image data from the last reproduction position (S203) to continuously reproduce the image data. When an instruction for reproduction stop is received from the user (S204), the system controller 11 detects a last reproduction position on a compressed block basis and updates the last reproduction position information in the TOC information recorded on the system information management area of the disk 6 (S205). The system controller 11 ends the processing when the video camera directly shifts into a power OFF mode or other modes. Since the last reproduction position information is processed on the compressed block basis, the last reproduction position information corresponds to a minimum unit for restoring moving image data, and it is therefore possible to reduce a preview time to a requisite minimum time.

In addition, even if a power off command is received suddenly during production, the system controller 11 always ends the processing after stopping the reproduction and recording the last reproduction position information.

In addition, when the disk 6 is changed to another disk, the system controller 11 reads the TOC information and the last reproduction position information recorded on the system information management area again and performs the same operations after that.

Next, processing in a recording mode will be explained.

Figure 3:
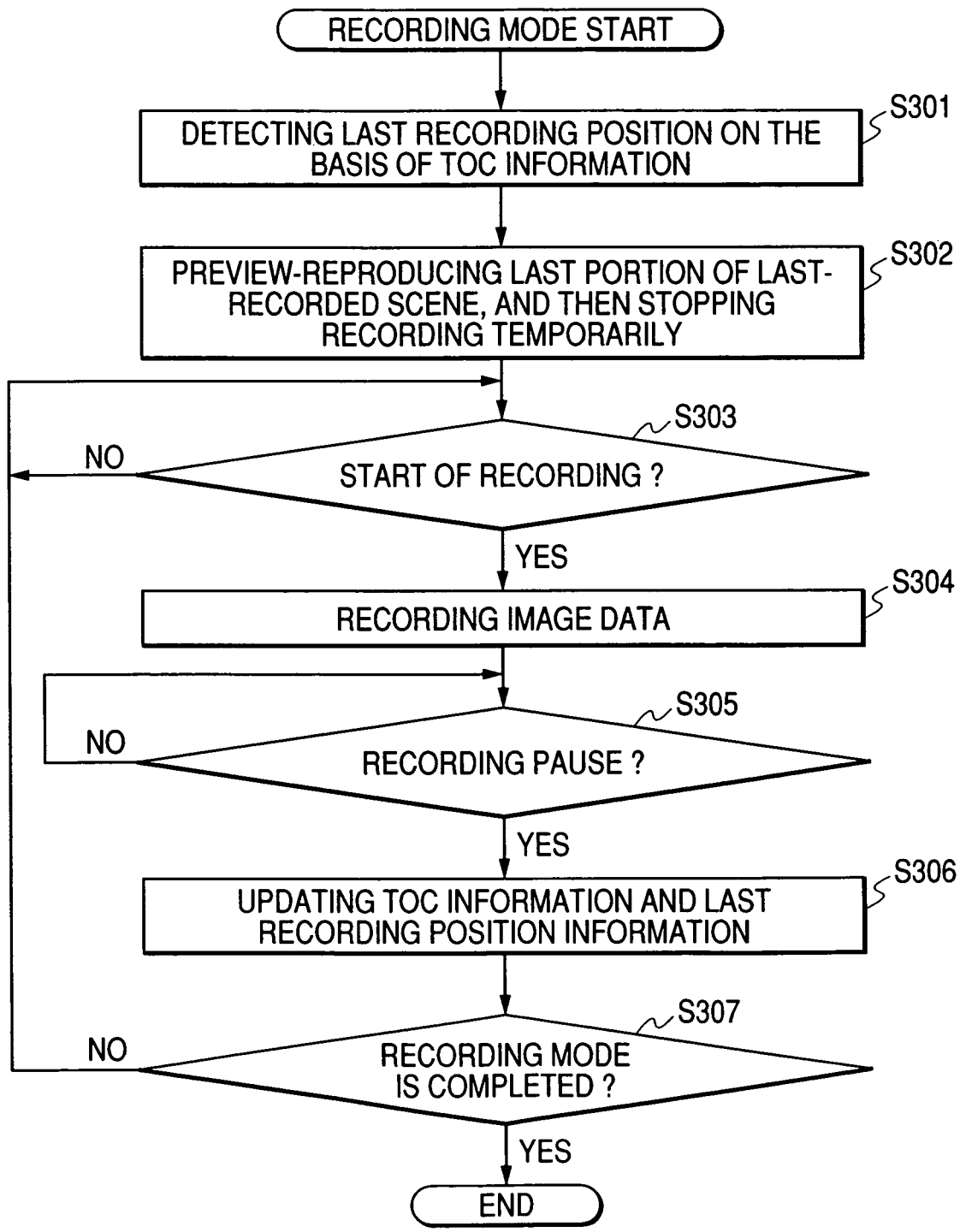
FIG. 3 is a flowchart showing processing at the time of recording.

FIG. 3 is a flowchart showing processing of the system controller 11 in the recording mode.

When the video camera is brought into the recording mode from a stopping state in response to an operation of the operation unit 12, the system controller 11 reads out TOC information recorded on the system information management area of the recording medium and detects a last recording position on the basis of last recording position information included in the TOC information (S301). Then, the system controller 11 preview-reproduces image data for a few seconds immediately before the last recording position and goes into a temporarily recording stopping state to stand by (S302). Next, when an instruction for start of recording is received from a user (S303), the system controller 11 starts recording of image data (S304), and when an instruction for recording pause is received (S305), updates the TOC information recorded on the system information management area on the recording medium and updates the last recording position information (S306). The system controller 11 ends the processing when the video camera directly shifts into a power OFF mode or other modes (S307).

Since the last recording position information is processed on the compressed block basis, which block allows reproduction of a moving image, it is possible to reduce a preview time to a requisite minimum time.

In addition, even if a power off command is received suddenly during recording, the system controller 11 always ends the processing after temporarily stopping the recording and recording the TOC information and the last recording position information.

In addition, when the recording medium is changed to another recording medium, the system controller 11 performs the same operations.

As described above, it is possible to preview a last reproduction position to start reproduction by reading last reproduction position information at the time of reproduction. It is possible to reproduce image data subsequently from a scene reproduced last even if a user desires to save a labor for searching the last reproduction position or does not clearly remember the last reproduction position. In addition, it is possible to provide a recording and reproducing apparatus integrated with a camera that can reduce a preview time of the last reproduction position to a requisite minimum time.

In addition, since in a recording mode, the system controller 11 previews a last recording position on the compressed block basis for a requisite minimum time on the basis of last recording position information and goes into a temporarily recording stopping state to stand by, a recording medium is usable like a tape, and it is possible to provide a recording and reproducing apparatus integrated with a camera that is easily used even by a user familiar with the tape.

Second Embodiment

Next, a second embodiment of the present invention will be explained.

In this embodiment, processing in a reproduction mode is different from the first embodiment, and the other kinds of processing are the same as the first embodiment.

Figure 4:
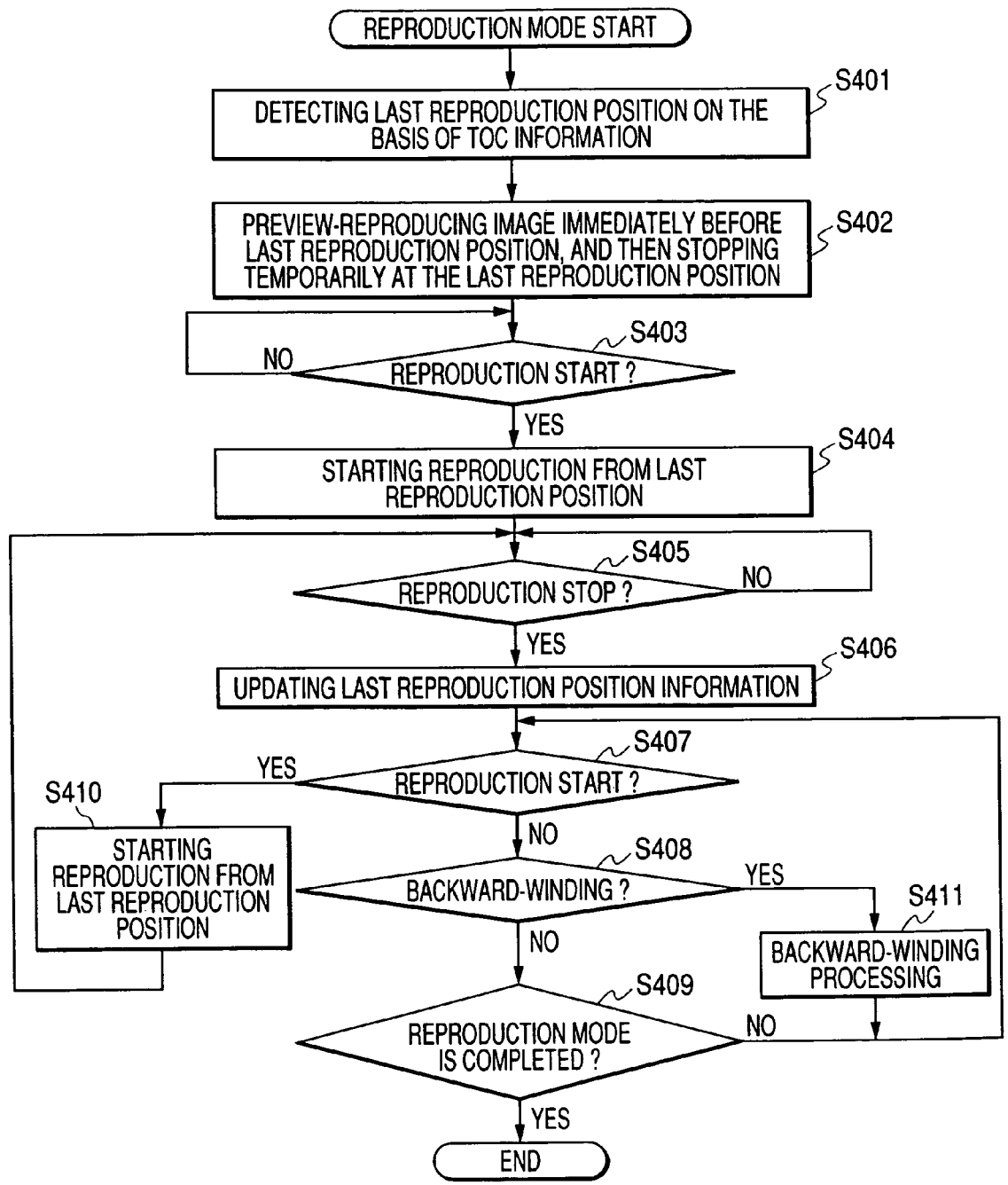
FIG. 4 is a flowchart showing another kind of processing at the time of reproduction.

FIG. 4 is a flowchart showing reproduction processing in the second embodiment.

When a video camera comes into a reproduction mode, the system controller 11 detects a last reproduction position on the basis of last reproduction position information included in TOC information reproduced from the disk 6 (S401), preview-reproduces image data for a few seconds immediately before the last reproduction position, and goes into a temporarily stopped state to stand by at the last reproduction position (S402). When a user instructs reproduction start (S403), the system controller 11 starts reproduction from the last reproduction position (S404), and when an instruction for reproduction stop is received (S405), updates last reproduction position information of the disk 6 (S406).

Thereafter, when an instruction for reproduction start is received again (S407), the system controller 11 starts reproduction of the image data again from a position a few seconds before the last reproduction position updated in S406 (S410).

In addition, when an instruction for backward-winding is received (S408), the system controller 11 performs backward-winding processing (S411).

When an instruction for ending the reproduction mode is received, the system controller 11 ends the processing directly (S409).

In this way, after switching to the reproduction mode, when an instruction for reproduction start is received, the system controller 11 starts reproduction from a position immediately before the last reproduction position. In reproduction after reproduction stop or after forward-winding and backward-winding, the system controller 11 reproduces image data directly without previewing the image data. Thus, the user is never bothered.

As described above, in the reproduction mode, the system controller 11 previews the last reproduction position on the basis of the last reproduction position information and goes into the temporarily reproduction stopping state to stand by. Thus, it is possible to provide a recording and reproducing apparatus integrated with a camera that allows a user to continuously reproduce and watch image data from a scene reproduced last even if the user does not consciously reproduce the image data.

Third Embodiment

Next, a third embodiment of the present invention will be explained.

In this embodiment, an index reproduction mode is provided in a reproduction mode, and processing in a recording mode is the same as the first and second embodiments.

Figure 5:
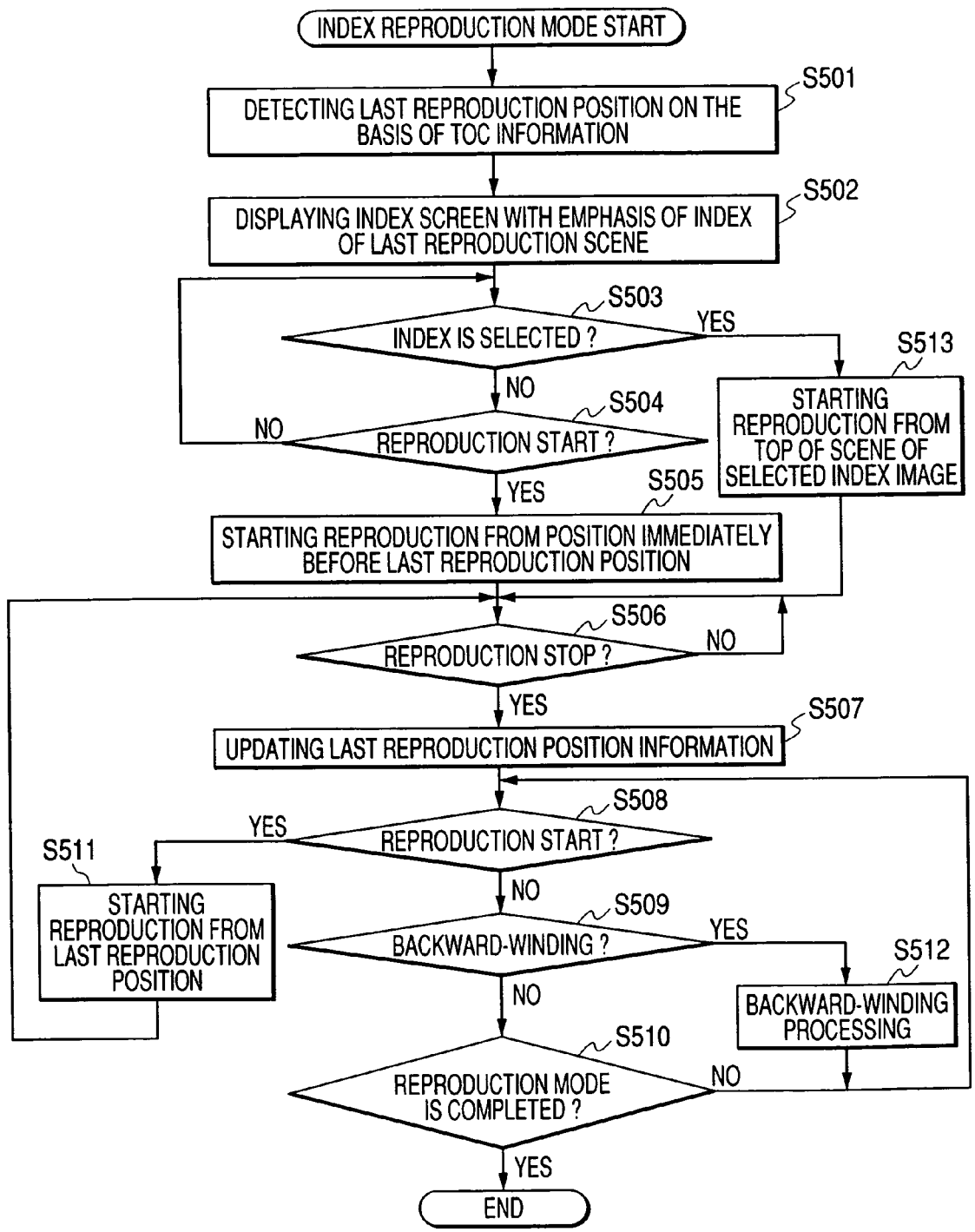
FIG. 5 is a flowchart showing another kind of processing at the time of reproduction.

FIG. 5 is a flowchart showing reproduction processing in the third embodiment.

Figure 6:
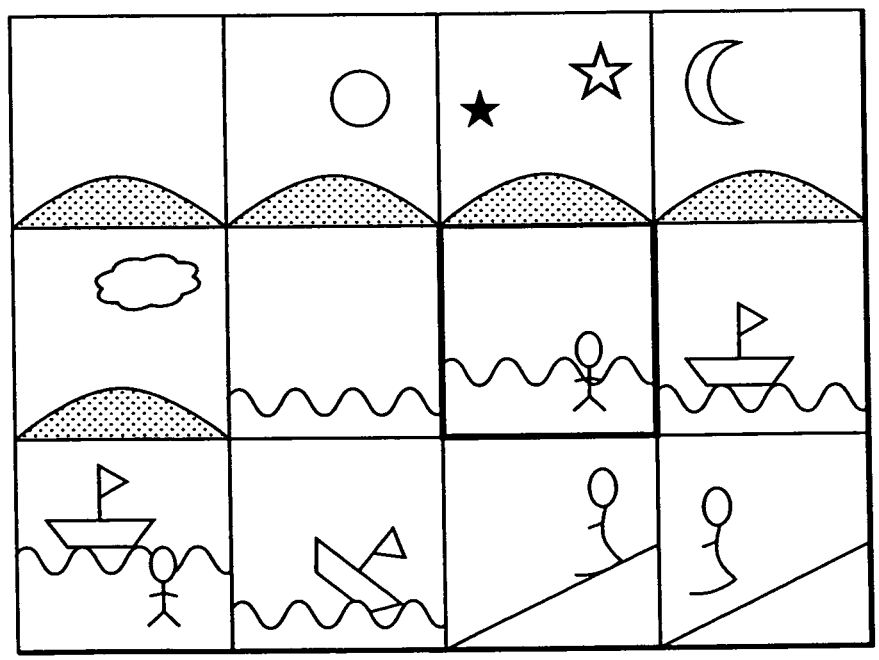
FIG. 6 is a diagram showing an index screen.

When a video camera comes into an index screen display mode, the system controller 11 detects a last reproduction position on the basis of last reproduction position information included in TOC information reproduced form the disk 6 (S501). Then, as shown in FIG. 6, the system controller 11 displays index screen of respective scenes and displays with emphasis an index image of a scene including the last reproduction position (S502).

When a user selects the index image and instructs reproduction start (S503), the system controller 11 starts reproduction from a top of a scene of the selected index image (S513).

When an instruction for reproduction start is received while the index image of the scene including the last reproduction position is displayed with the emphasis (S504), the system controller 11 starts preview reproduction from a position a few seconds before the last reproduction position and continues to reproduce image data (S505). When an instruction for reproduction stop is received (S506), the system controller 11 detects the last reproduction position information on the compressed block basis and updates the last reproduction position information on the disk 6 (S507).

Thereafter, when an instruction for reproduction start is received again (S508), the system controller 11 starts reproduction of the image data again from a position a few seconds before the last reproduction position updated in S507 (S511).

In addition, when an instruction for backward-winding is received (S509), the system controller 11 performs backward-winding processing (S512).

When an instruction for ending the reproduction mode is received, the system controller 11 ends the processing directly (S510).

As described above, the system controller 11 displays with emphasis an image section including the last reproduction position at the time of index screen display, and previews image data on the basis of the last reproduction position information to start reproduction when the video camera shifts into the reproduction mode. Thus, it is possible to provide a recording and reproducing apparatus integrated with a camera that allows a user to continuously reproduce and watch image data from a scene reproduced last even if the user does not consciously reproduce the image data.

Note that, in the embodiments described above, image data is recorded on a disk medium and reproduced from the disk medium. However, it is also possible to use other random-access media such as a semiconductor memory. The last reproduction position information may be recorded on a place other than a recording medium itself on which video images are recorded, for example, a memory IC integrated with the recording medium.

Note that the present invention may be applied to a system including plural apparatuses (e.g., a host computer, an interface apparatus, a reader, and a printer) or may be applied to an apparatus composed of one apparatus (e.g., a copying machine or a facsimile machine).

A scope of the present invention encompasses a recording apparatus that is implemented by supplying a program code of software for realizing the functions of the embodiment to a computer (a CPU or an MPU) in an apparatus or a system, which is connected to various devices, to actuate the various devices such that the functions of the embodiments are realized and causing the computer of the apparatus or the system to operate the various devices in accordance with the program stored therein.

In this case, the program code itself of the software realizes the functions of the above embodiments. The program code itself and means for supplying the program code to the computer, for example, a storage medium storing the program code constitute the present invention.

As the storage medium storing the program code, for example, a floppy disk, a hard disk, an optical disk, a magneto-optical disk, a CD-ROM, a magnetic tape, a nonvolatile memory card, and a ROM can be used.

It is needless to mention that the program code is included in the embodiments of the present invention not only in a case in which the computer executes the supplied program code to realize the functions of the embodiments but also in a case in which the program code cooperates with an operating system (OS) running on the computer or other application software to realize the functions of the embodiments.

It is needless to mention that the scope of the present invention encompasses a case in which the supplied program code is stored in a memory provided in a function extended board of the computer or a function extended unit connected to the computer, after which a CPU or the like provided in the function extended board or the function extended unit performs actual processing partly or entirely on the basis of an instruction of the program code, and the functions of the embodiments are realized by the processing.

The present invention is not limited to the embodiment described above, and various modifications are allowed without departing from the scope of appended claims.

This application claims priority from Japanese Patent Application No. 2003-391695 filed Nov. 21, 2003, which is hereby incorporated by reference herein.

What is claimed is:

1. A reproducing apparatus comprising:
a reproducing unit configured to reproduce image data from a random-access recording medium on which the image data of a plurality of scenes are recorded, the reproducing unit stopping reproducing the image data from the random-access recording medium in accordance with a reproduction stop instruction provided by an instruction unit, each of the plurality of scenes comprising a plurality of frames;
an output unit configured to output an index screen including index images of the image data of the plurality of scenes recorded on the random-access recording medium to a display device;
a detecting unit configured to detect a scene which is reproduced by the reproducing unit at a time of the reproduction stop instruction provided by the instruction unit from among the plurality of scenes of the image data recorded on the random-access recording medium, in accordance with an instruction for displaying the index screen,
wherein the output unit selects, based on a detection result by the detection unit, the scene detected by the detecting unit without a selection operation by a user responsive to the instruction for displaying the index screen and outputs an index screen including an index image of the detected scene to the display device, where the index image of the detected scene included in the index screen is selected in the index screen; and
a control unit configured to control the reproducing unit so as to reproduce the image data corresponding to a selected index image in the index screen displayed on the display device in accordance with a reproduction instruction.

2. An apparatus according to claim 1, wherein the control unit controls the reproducing unit, in accordance with the reproduction instruction, so as to start reproducing the image data of the scene corresponding to the selected index image in the index screen from a predetermined position related to a position at which the reproducing unit stops reproducing the image data in accordance with the reproduction stop instruction.

3. An apparatus according to claim 1, wherein the output unit outputs the index screen including the index image of the scene detected by the detecting unit and the index images of other scenes to the display device such at the index images are displayed in such a manner that the index image of the scene detected by the detecting unit can be discriminated from the index images of other scenes.

4. An apparatus according to claim 1, further comprising:
an imaging unit; and
a recording unit configured to record image data obtained by the imaging unit on the recording medium,
wherein the reproducing unit reproduces the image data recorded on the recording medium by the recording unit.

5. A control method of a reproducing apparatus including a reproducing unit configured to reproduce image data from a random-access recording medium on which the image data of a plurality of scenes are recorded, the reproducing unit stopping reproducing the image data from the random-access recording medium in accordance with a reproduction stop instruction received by a receiving unit, each of the plurality of scenes comprising a plurality of frames, the control method comprising the steps of:
outputting an index screen including index images of the image data of the plurality of scenes recorded on the random-access recording medium to a display device;
detecting a scene which is reproduced by the reproducing unit at a time of the reproduction stop instruction received by the receiving unit from among the plurality of scenes of the image data recorded on the random-access recording medium in accordance with an instruction for displaying the index screen,
wherein the outputting step selects, based on a detection result by the detection step, the scene detected in the detecting step without a selection operation by a user responsive to an instruction for displaying the index screen and outputs an index screen including an index image of the detected scene to the display device, where the index image of the detected scene included in the index screen is selected in the index screen; and
controlling the reproducing unit so as to reproduce the image data corresponding to a selected index image in the index screen displayed on the display device in accordance with a reproduction instruction.

6. A reproducing apparatus comprising:
a reproducing unit configured to reproduce image data from a random-access recording medium on which the image data of a plurality of scenes are recorded, the reproducing unit stopping reproducing the image data from the random-access recording medium in accordance with a reproduction stop instruction, each of the plurality of scenes comprising a plurality of frames;
an output unit configured to output an index screen including index images of the image data of the plurality of scenes recorded on the random-access recording medium to a display device;
a detecting unit configured to detect a scene which is reproduced last by the reproducing unit in response to the reproduction stop instruction from among the plurality of scenes of the image data recorded on the random-access recording medium, in accordance with an instruction for displaying the index screen,
wherein the output unit selects, based on a detection result by the detection unit, the last reproduced scene detected by the detecting unit without a selection operation by a user responsive to the instruction for displaying the index screen and outputs an index screen including an index image of the detected scene to the display device, where the index image of the detected scene included in the index screen is selected in the index screen; and
a control unit configured to control the reproducing unit so as to reproduce the image data corresponding to a selected index image in the index screen displayed on the display device in accordance with a reproduction instruction.

7. An apparatus according to claim 6, wherein the output unit outputs the index screen including the index image of the last-reproduced scene detected by the detecting unit and the index images of other scenes to the display device such that the index images are displayed in such a manner that the index image of the last-reproduced scene detected by the detecting unit can be discriminated from the index images of the other scenes.

8. An apparatus according to claim 6, further comprising:
an imaging unit; and
a recording unit configured to record image data obtained by the imaging unit on the recording medium,
wherein the reproducing unit reproduces the image data recorded on the recording medium by the recording unit.

9. An image processing apparatus comprising:
an obtaining unit configured to obtain image data read from a recording medium on which a plurality of scenes of image data are recorded, each of the plurality of scenes comprising a plurality of frames, reading of the image data from the recording medium being stopped in accordance with a reproduction stop instruction;
an output unit configured to output an index screen including index images of the plurality of scenes of image data recorded on the recording medium to a display device; and
a detecting unit configured to detect a scene which is read from the recording medium at a time of the reproduction stop instruction received by the receiving unit from among the plurality of scenes of image data recorded on the recording medium,
wherein the output unit selects, based on a detection result by the detection unit, the scene detected by the detecting unit without a selection operation by a user responsive to an instruction for displaying an index screen and outputs an index screen including an index image of the detected scene to the display device, where the index image of the detected scene included in the index screen is selected in the index screen.

10. An apparatus according to claim 9, further comprising:
an input unit configured to input image data; and
a recording unit configured to record the image data input by the input unit on the recording medium.

11. An apparatus according to claim 9, further comprising:
a controller configured to control reading of the image data from the recording medium, responsive to a reproduction instruction, so that the image data of a scene corresponding a selected index image in the index screen displayed on the display device is read from the recording medium.

12. An apparatus according to claim 9, wherein the recording medium includes a disc recording medium.

13. An apparatus according to claim 9, wherein the recording medium includes a semiconductor memory.

14. An apparatus according to claim 9, wherein the obtaining unit includes a reproducing unit that reads the image data from the recording medium.

15. An apparatus according to claim 9, wherein the image data obtained by the obtaining unit compressed.

16. An apparatus according to claim 1, wherein the output unit outputs the index screen including the index image of the scene detected by the detecting unit and the index images of other scenes to the display device responsive to the instruction for displaying the index screen such that the index image of the scene detected by the detecting unit and the index images of the other scenes are displayed on the same screen of the display device.

17. An apparatus according to claim 6, wherein the output unit outputs the index screen including the index image of the scene detected by the detecting unit and the index images of other scenes to the display device responsive to the instruction for displaying the index screen such that the index image of the scene detected by the detecting unit and the index images of the other scenes are displayed on the same screen of the display device.

* * * * *